Figure 1:
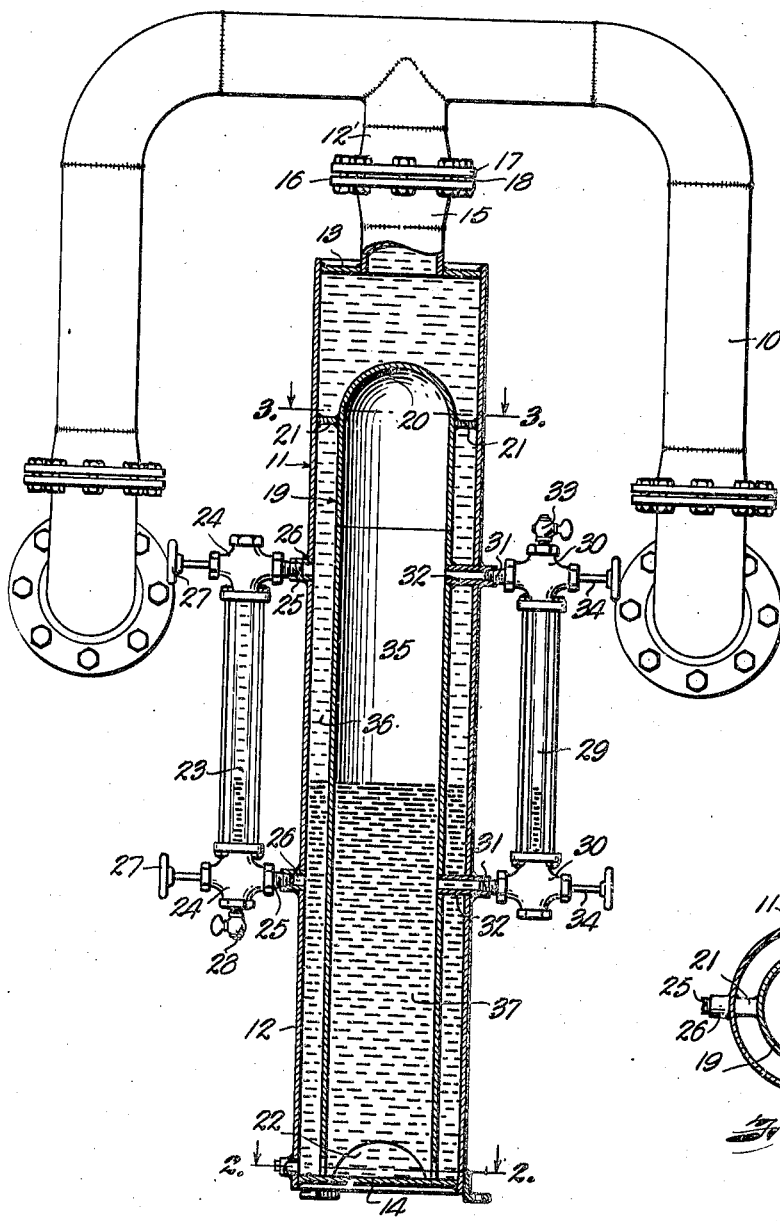

Feb. 8, 1944.  D. D. GREENWELL ET AL  2,341,501
PRESSURE EQUALIZER
Filed Sept. 15, 1941

INVENTORS.
Dale D. Greenwell
Harold W. Stalnaker
BY Thos. E. Scofield
ATTORNEY.

Patented Feb. 8, 1944

2,341,501

UNITED STATES PATENT OFFICE 2,341,501

PRESSURE EQUALIZER

Dale D. Greenwell and Harold W. Stalnaker, Kansas City, Mo., assignors to Great Lakes Pipe Line Company, Kansas City, Mo., a corporation of Delaware Application September 15, 1941, Serial No. 410,810

1 Claim. (Cl. 138—26)

Our invention relates to new and useful improvements in pressure equalizers for pipe lines.

All pipe lines must have a pressure equalizer or surge chamber in proximity to the pump to absorb the shocks resulting from surges of the liquid in the line. Various arrangements have been suggested by the prior art. Within our knowledge, these arrangements usually comprise a surge chamber extending from and communicating with the pipe line. A portion of the liquid in the line is thus permitted to enter the chamber. A suitable valve is usually provided at the outer end of the chamber for introducing compressed air therein. The air acts as a cushion to mitigate the hydraulic forces created by surges of the liquid in the line at each operation of the pump.

In many of the arts, and particularly in the gasoline art, trouble is encountered by reason of the fact that the liquid in the chamber will absorb the air, thus reducing its efficiency as a shock absorber. In addition, absorption of the air causes free oxygen to enter the pipe line thereby to corrode the pipes and to develop gum-forming tendencies in the gasoline.

Other suggestions of the art are embodied in the mechanical type alleviators. While this type of alleviator will prevent absorption of air by the liquid in the pipe line, its operation is faulty in that considerable friction is developed by the packing separating the air chamber from the fluid chamber. This friction loss more than compensates for other advantages gained by use of the mechanical arrangement.

We have developed a pressure equalizer that will absorbed the surges of the liquid in the pipe line without the friction losses of the mechanical arrangement and without loss of air from the chamber by absorption into the liquid being pumped. We accomplish this result by interposing a fluid insulating medium or seal comprising a solution of water and sodium dichromate or the like between the air and the liquid in the pipe line. The solution of water and sodium dichromate given by way of example is inert to absorption of air from the chamber and is insoluble in and of higher specific gravity than the liquid being pumped. When freezing temperatures occur, the above seal may be replaced by ethylene glycol, Prestone or the like.

An important object of our invention, therefore, is to provide a pressure equalizing arrangement for pipe lines that will not be rendered faulty or inefficient in operation by friction losses and that will prevent free oxygen from having access into the fluid in the pipe line.

Other objects and advantages of our invention will be apparent during the course of the following description.

Figure 3:
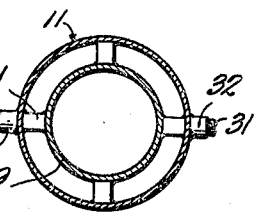
Figure 2:
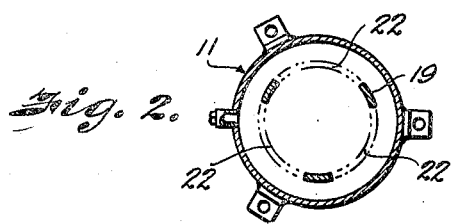

In the drawing forming a part of this specification and wherein like numerals are employed to designate like parts throughout the same, Fig. 1 is a longitudinal sectional view of a pressure equalizing device embodying our invention, the same being shown in operative association with a pipe line, Fig. 2 is a transverse sectional view taken on the line 2—2 of Fig. 1, and Fig. 3 is a transverse sectional view taken on the line 3—3 of Fig. 1.

In the accompanying drawing, wherein for the purpose of illustration is shown a preferred embodiment of our invention, the numeral 10 designates a portion of a fluid pipe line leading from the conventional pump (not shown). The pipe section here illustrated is of inverted U shaped formation and is provided with a depending nozzle 12' at substantially the middle thereof. A pressure equalizer 11 embodying our invention is secured to the nozzle 12'. The pressure equalizer comprises an outer cylindrical casing 12, the upper and lower ends of which are closed by heads 13 and 14. The upper head 13 is formed with an upwardly extending neck portion 15 having a radial flange 16 at its end which seats against the radial flange 17 on the depending nozzle 12'. A gasket 18 of suitable material is interposed between the flanges 16 and 17 to provide a fluid-tight union after the flanges of the neck and nozzle have been securely bolted together.

It may thus be seen that the casing 11 is suspended from the nozzle 12' of the pipe line and that liquid from the pipe line may flow through the nozzle and into the casing. At each operation of the pump to which the pipe line is connected, the hydraulic pressures created by surges of the liquid in the pipe line will also be transmitted to the liquid in the casing. In order that these impulses or surges may be absorbed and rendered ineffective, we have provided a cylindrical surge chamber 19 within the casing. The cylinder is of substantially smaller diameter than the internal diameter of the casing and the outer wall thereof is, therefore, spaced substantially from the inner wall of the casing. The upper end of the inner cylinder is closed by an integral wall 20 which is disposed substantially below the upper head of the casing and the lower end thereof is fixedly secured to the lower head 14. The upper end of the cylinder is rigidly supported by a plurality of radially extending reinforcing arms 21 which bridge the annular space between the cylinder and casing and fixedly connect with the inner wall of the casing. This arrangement is best illustrated in Fig. 3, and it will be noted that the arms are spaced a substantial distance apart so that they will in no way interfere with the free flow of fluid in the annular space between the casing and cylinder.

The lower end of the cylinder is formed with a plurality of ports 22 which permit free communication between the casing and cylinder. We prefer that the combined areas of the ports be the same as the cross sectional area of the cylinder in order that there will be no restriction of fluid flow between the cylinder and casing.

A sight glass 23 is provided at its opposite ends with fittings 24 which include nozzles 25 screw threadedly received within openings 26 in the casing. Each of the fittings 24 is provided with an internal valve adapted to be manually operated by means of a hand wheel 27 to regulate the flow of liquid from the casing into the sight glass. A pet cock 28 carried by the lower fitting 24 permits the fluid in the sight glass to be drained therefrom when desired.

A second sight glass 29 is similarly provided with fittings 30 at its upper and lower ends. Each of the fittings is formed with a nozzle 31 which is screw threadedly received within a respective one of the sleeves 32 extending radially from the inner cylinder and through the circumjacent wall of the casing. An air charging valve 33 is carried by the upper fitting 30 which permits air under pressure to be introduced into the upper end of the cylinder. Manually operated hand wheels 34 carried by the fittings 30 similarly operate valves within the fittings to control the passage of air and fluid from the inner cylinder into the sight glass.

Obviously liquid entering the casing from the pipe line will enter the inner cylinder through the ports 22 and rise therein to a height where the pressure of the liquid is counterbalanced by the pressure of the air trapped in the upper portion of the cylinder. The upper portion of the cylinder, therefore, comprises an air chamber 35. A sufficient quantity of air under pressure can be introduced into the chamber through the air charging valve 33 to dispose the normal level of the liquid substantially mid-way between the ends of the cylinder. It is to be understood that the level of the liquid in the cylinder must be above the ports 22 and preferably above the lower sleeve 31. The level of the liquid in the cylinder is controlled by the quantity of air in the chamber 35 and it will be readily apparent that the liquid in the cylinder may enter the sight glass 29 through the lower sleeve and fittings 31 and 30 to indicate the level of the liquid in the cylinder. Consequently, surges of the liquid in the pipe line caused by operation of the pump are transmitted through the liquid in the casing and absorbed by the cushion of compressed air in the chamber 35.

The present arrangement has been developed primarily, though not exclusively, for use in connection with pipe lines transporting gasoline. We have found that the gasoline in the pressure equalizer will absorb oxygen from the compressed air in the surge chamber 35. Quantities of free oxygen, therefore, rise in the pressure equalizer and enter the stream of gasoline traversing the pipe line. This oxygen corrodes the pipe line and produces gum-forming tendencies in the gasoline.

We propose, therefore, to obviate these difficulties by interposing a fluid insulating medium or liquid seal between the air in chamber 35 and the pipe line liquid in the outer casing. The fluid insulating medium is characterized by the fact that it is inert to the absorption of air and insoluble in and of higher specific gravity than the flow line liquid.

In Fig. 1 we designate the pipe line liquid by the numeral 36 and the fluid insulating medium by the numeral 37. By reason of the fact that the insulating medium is of a lower specific gravity than the pipe line liquid, the insulating medium will settle to the lower end portions of the casing and cylinder. The inner cylinder should contain nothing but insulating medium and obviously, the level of the insulating medium in the casing will be equal to the level of the medium in the cylinder. The level of the medium in the cylinder will be registered by the sight glass 29 and the level of the medium in the casing will be registered by the sight glass 23.

The operation of the device after the insertion of the fluid insulating medium will be identical with the operation of the device without insulating medium, the only difference being that oxygen from the air in the surge chamber will be prevented from entering the pipe line by reason of the inherent characteristics of the insulating medium. Oxidation of the pipe line and formation of gum in the gasoline will, therefore, be prevented. The device will not be faulty in operation by reason of friction losses and it will be at all times immediately responsive to hydraulic impulses in the pipe line.

We propose to use a solution of water and sodium dichromate as the insulating medium; however, this solution is given merely by way of example. There are other solutions which will be equally efficacious in preventing deleterious gaseous constituents from passing from the surge chamber and into the pipe line. Any solution may be used which is insoluble in and of a higher specific gravity than the liquid in the pipe line and which is inert to the absorption of air from the chamber. When freezing weather occurs, we propose to use a solution of water and ethylene glycol, Prestone, or other suitable substance.

It is to be understood that the form of our invention herewith shown and described is to be taken as a preferred example of the same and that various changes in the size, shape and arrangement of the parts may be resorted to without departing from the spirit of our invention or the scope of the appended claim.

Having thus described our invention, we claim:

A pressure equalizer for pipe lines comprising spaced inner and outer casings disposed below the pipe line, the upper end of the outer casing being attached to and communicating with the pipe line and the said inner casing having ports at its lower end affording communication between the casings, means for introducing air under pressure into the inner casing, and a liquid insulating medium at the lower ends of the casing, the said medium rising to a level above the said ports and being insoluble in and of a higher specific gravity than the liquid in the pipe line and being inert to the absorption of air from the inner casing, the arrangement being such that increased pressures in the pipe line will depress the surface of the insulating medium in the outer casing and raise the surface of the medium in the inner casing thereby further compressing the air in the inner casing, said medium preventing the air from being absorbed in the pipe line liquid.

DALE D. GREENWELL.
HAROLD W. STALNAKER.